(12) United States Patent
Ying et al.

(10) Patent No.: US 8,594,078 B2
(45) Date of Patent: Nov. 26, 2013

(54) METHOD AND APPARATUS FOR STAND-ALONE VOICE OVER INTERNET PROTOCOL WITH POTS TELEPHONE SUPPORT

(75) Inventors: Goangshiuan Shawn Ying, Oakland, CA (US); Eugene L. Edmon, Danville, CA (US); Carlton Ligar Brown, Danville, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1235 days.

(21) Appl. No.: 10/452,837

(22) Filed: Jun. 2, 2003

(65) Prior Publication Data

US 2004/0240432 A1  Dec. 2, 2004

(51) Int. Cl.
*H04L 12/66* (2006.01)

(52) U.S. Cl.
USPC .................. 370/353; 379/88.17; 379/353

(58) Field of Classification Search
USPC .................. 379/88.17, 88.13, 352–353; 370/352–356
See application file for complete search history.

(56) References Cited

U.S. PATENT DOCUMENTS

| | | | |
|---|---|---|---|
| 5,887,177 A * | 3/1999 | Heyl | 713/300 |
| 6,169,734 B1 | 1/2001 | Wilson | |
| 6,243,376 B1 * | 6/2001 | Ng et al. | 370/352 |
| 6,463,051 B1 | 10/2002 | Ford | |
| 6,480,581 B1 | 11/2002 | Wu et al. | |
| 6,529,501 B1 | 3/2003 | Zhao et al. | |
| 6,542,498 B2 * | 4/2003 | Socaciu | 370/352 |
| 6,570,849 B1 * | 5/2003 | Skemer et al. | 370/230.1 |
| 6,697,357 B2 * | 2/2004 | Emerson, III | 370/352 |
| 6,731,950 B1 * | 5/2004 | Giles | 455/556.1 |
| 6,826,174 B1 * | 11/2004 | Erekson et al. | 370/352 |
| 6,873,689 B1 * | 3/2005 | Butler et al. | 379/93.05 |
| 6,876,648 B1 * | 4/2005 | Lee | 370/353 |
| 6,914,978 B2 * | 7/2005 | Huang et al. | 379/359 |
| 6,954,455 B1 * | 10/2005 | Al Hakim et al. | 370/352 |
| 7,092,375 B2 * | 8/2006 | Pitsoulakis | 370/338 |

(Continued)

FOREIGN PATENT DOCUMENTS

| | | |
|---|---|---|
| JP | 2000-134287 | 5/2000 |
| JP | 2001-127883 | 5/2001 |

(Continued)

OTHER PUBLICATIONS

Witowsky, William E., Senoir Vice President Engineering & Chief Technical Officer, Telogy Networks, Inc., a Texas Instruments Company, "IP Telephone Design and Implementation Issues" White Paper; Jul. 1998, Version 2.2 SPEY 004.

(Continued)

*Primary Examiner* — Simon Sing
(74) *Attorney, Agent, or Firm* — Toler Law Group, PC

(57) ABSTRACT

An apparatus and methods for utilizing a stand-alone Voice over Internet Protocol (VoIP) telephone with traditional plain old telephone service (POTS) telephone support is disclosed. A stand-alone VoIP telephone with an analog telephone adaptor supporting a plurality of external analog telephone sets and a digital Internet protocol (IP) interface to support VoIP voice data communication over a data channel is presented. The VoIP telephone is used to establish VoIP service line data connections between a VoIP telephone and a data switch to an IP network. The VoIP telephone receives an analog telephone signal from an external analog telephone and establishes a voice connection between the external analog telephone and the VoIP telephone.

3 Claims, 7 Drawing Sheets

(56) References Cited

U.S. PATENT DOCUMENTS

| | | | |
|---|---|---|---|
| 7,123,606 B2* | 10/2006 | Wu et al. | 370/352 |
| 7,170,980 B2* | 1/2007 | Lim | 379/93.07 |
| 7,296,186 B2* | 11/2007 | So et al. | 714/30 |
| 7,313,231 B2* | 12/2007 | Reid | 379/221.01 |
| 7,382,786 B2* | 6/2008 | Chen et al. | 370/401 |
| 2001/0040885 A1* | 11/2001 | Jonas et al. | 370/352 |
| 2002/0105946 A1 | 8/2002 | Takeuchi | |
| 2002/0186686 A1 | 12/2002 | Chen | |
| 2003/0002637 A1 | 1/2003 | Miyauchi et al. | |
| 2003/0137973 A1* | 7/2003 | Kim et al. | 370/352 |
| 2003/0214940 A1* | 11/2003 | Takken | 370/352 |
| 2004/0107299 A1* | 6/2004 | Lee et al. | 709/249 |
| 2004/0116108 A1* | 6/2004 | Ra | 455/418 |
| 2004/0137875 A1* | 7/2004 | Ueno | 455/408 |
| 2005/0073995 A1* | 4/2005 | Yeh et al. | 370/352 |
| 2008/0025484 A1* | 1/2008 | Liu et al. | 379/93.05 |

FOREIGN PATENT DOCUMENTS

| | | |
|---|---|---|
| JP | 2001-257723 | 9/2001 |
| WO | 9905590 A2 | 2/1999 |
| WO | 0072168 A1 | 11/2000 |

OTHER PUBLICATIONS

Japanese Office Action, JP Patent Application No. 2006-514330, Mailed Mar. 24, 2009.

International Search Report for International Application No. PCT/US04/14438, mailed on Nov. 3, 2005.

Written Opinion of the International Searching Authority for International Application No. PCT/US04/14438, mailed on Nov. 3, 2005.

English Translation of Mexican Office Action dated Jul. 4, 2008.

Supplemental European Search Report from the European Patent Office for corresponding EP Application No. 04751704.0 dated Jun. 23, 2010, 3 pages.

Proceeding further with the European patent application pursuant to Rule 70(2) EPC for EP Application No. 04751704.0 dated Jul. 12, 2010, 1 page.

* cited by examiner

METHOD AND APPARATUS FOR STAND-ALONE VOICE OVER INTERNET PROTOCOL WITH POTS TELEPHONE SUPPORT

FIELD OF THE INVENTION

The present disclosure relates generally to Voice over Internet Protocol (VoIP) telephony, and specifically to a stand-alone VoIP telephone with traditional plain old telephone system (POTS) support.

DESCRIPTION OF THE RELATED ART

Internet protocol (IP) telephones have been deployed to provide Voice over Internet Protocol (VoIP) service to the business/enterprise sector. VoIP services have provided considerable cost savings over that of conventional long-distance telephone service carriers, particularly for large multi-national corporations with numerous satellite offices.

Typically, an IP telephone set connects to the corporate local area network (LAN) and/or data network through an Ethernet connection to a voice-enabled router in the corporate environment. Many currently available IP telephones such as those manufactured by Cisco, Siemens, Polycom, and Alti-IP have an Ethernet jack, e.g. RJ45, to connect the IP telephone to the LAN connection, and an additional RJ45 jack to connect the IP telephone and a computer to the corporate LAN connection.

Consumers, e.g., residential customers, do not generally purchase more than a single IP telephone, as the cost of a single IP telephone is on the order of several hundreds of dollars. Many households do, however, have more than one POTS telephone set.

Current stand-alone IP telephone sets do not support same line extension to traditional POTS telephone sets. Thus, when a residential customer purchases a single IP telephone and subscribes to a VoIP service, calls can only be made through the single IP telephone and not the existing POTS telephone sets. Requiring consumers to purchase multiple IP telephones would be undesirable due to the average consumer's budget limits, even considering the long-distance savings realized by use of an IP telephone. To support same line extension with the current design of IP telephone sets, multiple IP telephone sets are required, and the service provider is typically involved in the provisioning process for the installation of each IP telephone in the same household with the same telephone number. This process is costly for both the consumer and the service provider.

Accordingly, a need exists for a stand-alone IP telephone that is capable of supporting conventional telephone sets over the same line extension.

SUMMARY

In a particular embodiment, a method is presented for establishing a voice connection using a stand-alone Voice over Internet Protocol (VoIP) telephone. The method includes establishing a voice over Internet protocol service line data connection between a VoIP telephone and a data switch to an Internet protocol (IP) network. An analog telephone signal from at least one external analog telephone is received at the stand-alone VoIP telephone, and a voice connection is established between the external analog telephone set and the stand-alone VoIP telephone.

In a particular embodiment, the stand-alone VoIP telephone apparatus includes an analog telephone interface adaptor which supports a plurality of external analog telephone sets. In another embodiment, the stand-alone VoIP telephone apparatus includes an encoder and decoder module responsive to the analog telephone interface adaptor and responsive to a handset belonging to the VoIP telephone apparatus, as well as a digital signal processing circuit responsive to the encoder and decoder module. The VoIP telephone also includes a time division multiplexer coupled to the digital signal processing circuit and to the digital Internet protocol (IP) interface.

In a further embodiment, a method for establishing a voice connection using a stand-alone VoIP telephone is presented. The method includes establishing a VoIP service line data connection between a stand-alone VoIP telephone and a data switch, receiving VoIP voice signaling data at a VoIP telephone network, receiving an analog signal from at least one external analog telephone set at the VoIP telephone, and establishing a voice connection between the external analog telephone set and the stand-alone VoIP telephone. In a particular embodiment, the data switch is connected to an IP network. In another embodiment, the method further comprises sending an analog signal from the at least one external analog telephone set to the VoIP telephone.

In another embodiment, a method of communicating between an analog telephone unit and a stand-alone VoIP telephone is presented. The method includes receiving a request from a user of an analog telephone unit to place a call, processing the request, and sending an analog signal from the telephone unit over a telephone line that supports voice traffic to the stand-alone VoIP telephone. The VoIP telephone includes a data interface to support communication of voice over Internet protocol.

In a further embodiment, a method of communicating between a telephone unit and a VoIP telephone is disclosed. The method includes receiving a telephone signal from the VoIP telephone, wherein the VoIP telephone includes a data interface to support communication of voice over Internet protocol. The method further includes processing the received telephone signal, and establishing a voice connection between the telephone unit and the VoIP telephone.

In another embodiment, a method of communicating using a VoIP telephone is presented. The method includes receiving telephone traffic from at least one of a plurality of external telephone units sharing a common telephone line at a VoIP telephone, converting the telephone traffic into digital VoIP data, and communicating the digital VoIP data to data switching equipment. In a particular embodiment, the method further includes sending the digital VoIP data from the data switching equipment over an Internet protocol network.

DESCRIPTION OF THE DRAWINGS(S)

The present disclosure is generally directed to a voice over Internet protocol (VoIP) telephone which provides support for a traditional plain old telephone service (POTS) telephone set using a common line extension, and may be better understood with reference to FIGS. 1 through 8.

Figure 1:
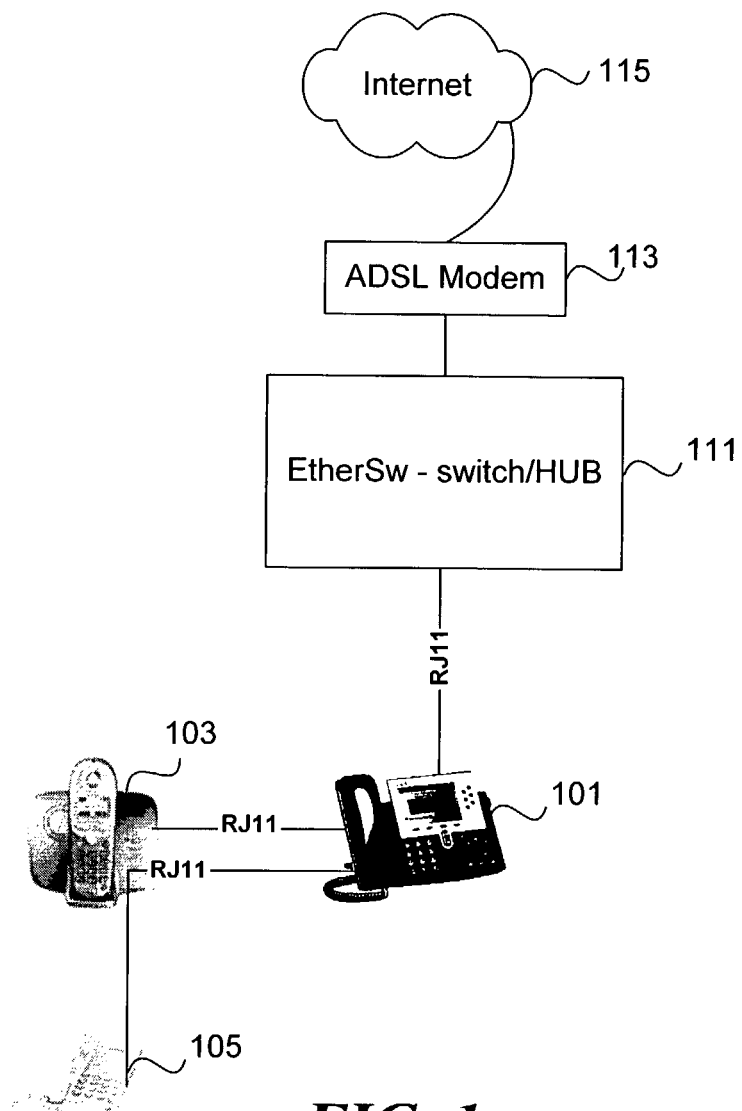
FIG. 1 is a general diagram illustrating a stand-alone VoIP telephone with traditional POTS telephone set support for a same line extension.

FIG. 1 illustrates an embodiment of a stand-alone voice over Internet protocol (VoIP) telephone with traditional plain old telephone service (POTS) telephone support for a same (common) line extension. In the example of FIG. 1, a stand-alone VoIP telephone 101 has two analog telephone extensions 103 and 105 connected via an analog interface, e.g., RJ11 adaptor, within the VoIP telephone 101. VoIP telephone 101 is connected to a digital interface, e.g. RJ45 adaptor, to an EtherSwitch 111. EtherSwitch 111 is, in turn, connected via a service line data connection to data switching equipment 113. The data switching equipment 113 is configured to communicate digital voice over Internet protocol data over the Internet protocol network 115, such as the Internet.

In a particular example, the digital switching equipment 113 is a modem. The modem may be an asynchronous digital subscriber line (ADSL) modem, a digital subscriber line (DSL) modem, a cable modem, or other high-speed interface. A personal computer (PC) 109 may also be connected to EtherSwitch 111 to provide the PC 109 access to the IP network 115. EtherSwitch 111 includes logic to prioritize data transmission, e.g., to prioritize VoIP data from VoIP telephone 101 over that of PC 109 data, as needed.

It should be noted that although the two separate RJ11 lines extending from the analog telephone extensions 103 and 105 are illustrated as going into two separate locations in the VoIP telephone 101. In an alternate embodiment the VoIP telephone 101 would permit an analog telephone interface design such that a "side by side" arrangement is utilized, rather than the separate RJ11 input points shown in FIG. 1 and FIG. 2.

Figure 2:
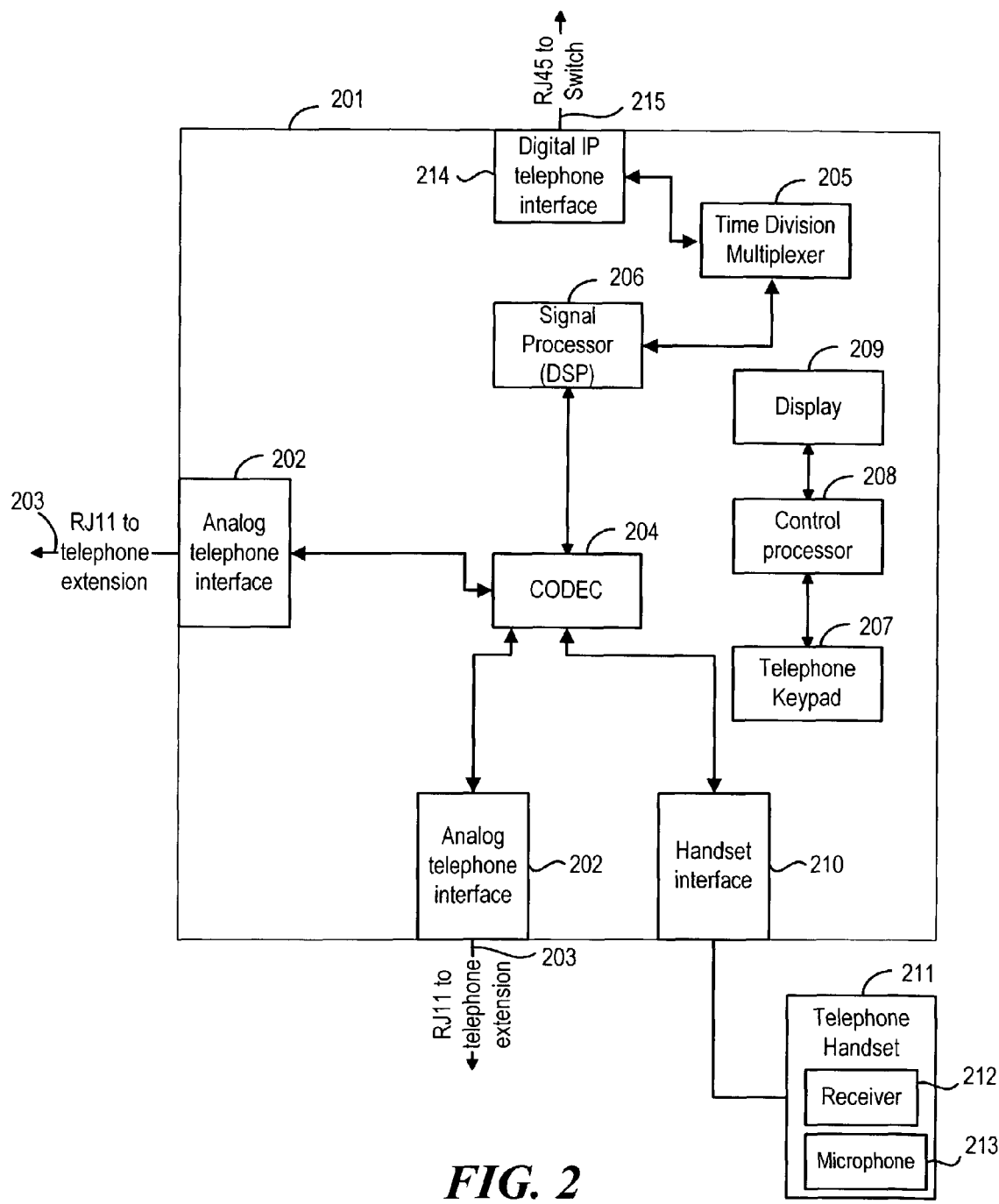
FIG. 2 is a block diagram illustrating an embodiment of a VoIP telephone system.

FIG. 2 is a block diagram illustrating a stand-alone VoIP telephone apparatus 201. The VoIP telephone apparatus 201 includes the following components: an analog telephone interface adaptor 202 with an RJ11 connection 203 to an analog telephone extension; an encoder and decoder (codec) module 204 responsive to a dedicated VoIP telephone handset 211 and responsive to the analog telephone interface adaptor 202; a time division multiplexer 205 incorporated into the encoder/decoder module 204; a digital signal processing circuit 206 responsive to the encoder/decoder module 204; a telephone keypad 207 responsive to caller input; a control processor 208; a visual display window 209 responsive to an external analog telephone interface; a digital Internet protocol (IP) interface 214; and a RJ45 connection 215 to a data switch. In another embodiment, multiple external analog telephone sets share a common line with the VoIP telephone 201.

A handset interface 210 is connected to the dedicated VoIP telephone handset 211, which contains a receiver 212 and a microphone 213. The control processor 208 provides processing for the typical user interaction functions of a telephone, for example, processing the inputs detected by keypad 207, displaying user information, such as dialed numbers, in display window 209, providing an audible and visual indicator for outgoing or incoming calls, and the like. In an illustrative embodiment, the visual display window is responsive to call feature management services such as Caller ID and Call Blocking. More complex telephone features may also be provided, such as redial, hold, and transfer. In another particular embodiment, the stand-alone VoIP telephone apparatus 201 may include a visual display window, such as visual display window 209, responsive to an external analog telephone interface.

It will be appreciated that other components may be incorporated into the VoIP telephone 101 which are not specifically illustrated herein. Examples of other components include a serial interface to allow communication to a device to permit coordination of telephone information and to provide automatic dialing. Functions to perform VoIP voice processing, call processing, protocol processing, and network management software functions of a stand-alone VoIP telephone may also be provided by the VoIP telephone 101.

Figure 3:
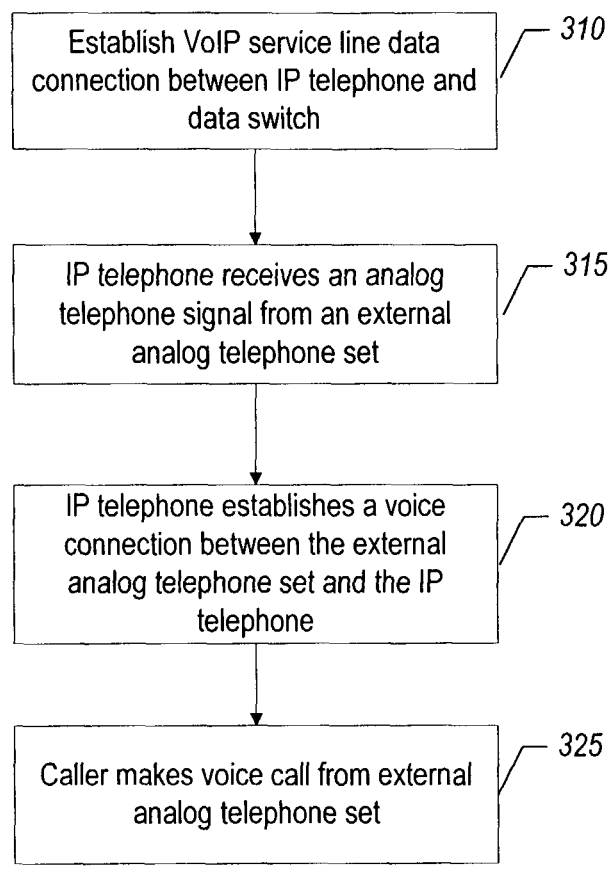
FIG. 3 is a flow diagram illustrating a method for establishing a voice connection using a stand-alone VoIP telephone.

An embodiment of a method for establishing a voice connection using a stand-alone VoIP telephone is presented in the flow diagram of FIG. 3. In step 310, a VoIP service line data connection is established between a stand-alone VoIP telephone and a data switch to an Internet protocol (IP) network. In step 315, the VoIP telephone receives an analog telephone signal, e.g., an analog telephone off-hook signal from at least one external analog telephone set at the VoIP telephone.

In step 320, the VoIP telephone establishes a voice connection between the at least one external analog telephone set and the VoIP telephone. For example, the VoIP telephone provides a dial tone to the external analog telephone and collects the TDMF tones from user input into the external analog telephone set, and translates the TDMF tones to dialed digits. These dialed digits are packetized and sent to an IP network. In step 325, a caller using the external analog telephone set makes a voice call. The VoIP telephone packetizes the voice data, which is sent to the IP network. A caller using the external analog telephone set receives line status information about the called party, e.g., no answer, busy signal, network not available, conversation with the called party, through the VoIP telephone.

Figure 4:
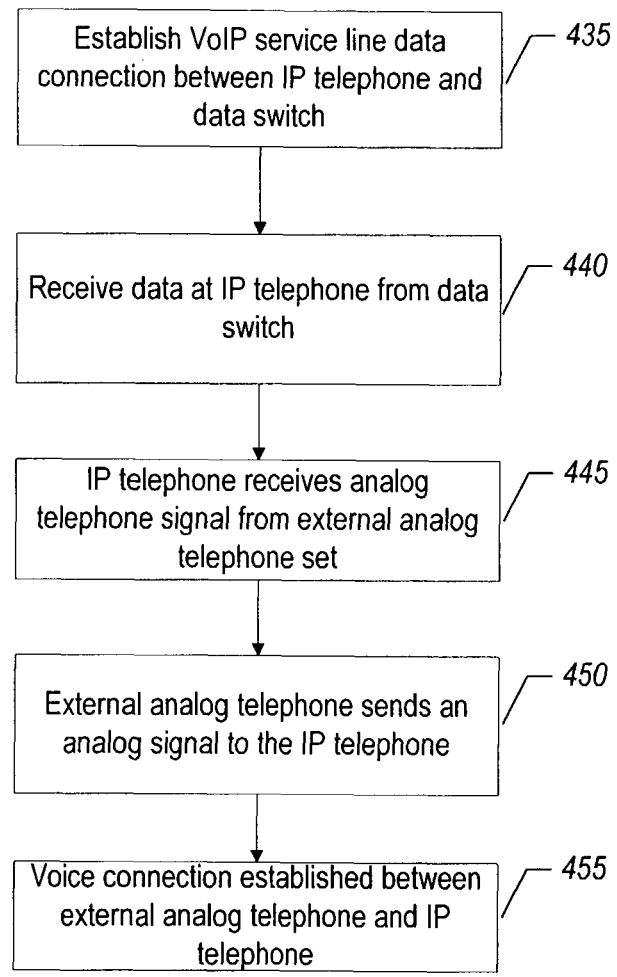
FIG. 4 is a flow diagram illustrating a method for establishing a voice connection using a stand-alone VoIP telephone.

FIG. 4 is a flow diagram illustrating an embodiment of a method for establishing a voice connection using a stand-alone VoIP telephone. In step 435, a Voice over Internet Protocol (VoIP) data line connection is established between a stand-alone VoIP telephone and a data switch. In one embodiment, the data switch is connected to an Internet protocol (IP) network. VoIP voice signaling data is received at a VoIP telephone network in step 440. In step 445, an analog telephone signal is received from at least one external analog telephone set at the VoIP telephone. In step 450, an external analog telephone set sends an analog signal to the VoIP telephone, and in step 455 a voice connection is established between the external analog telephone set(s) and the VoIP telephone.

Figures 5, 6:
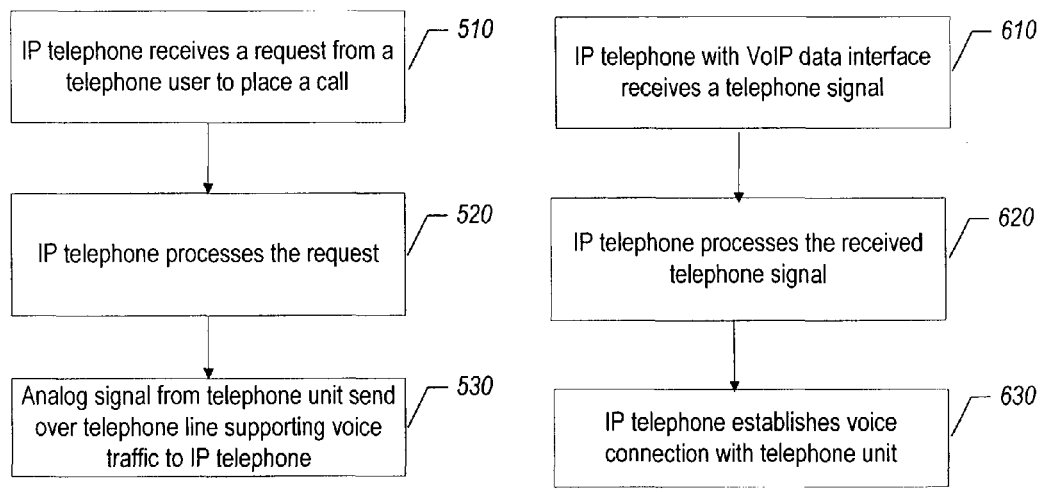
FIG. 5 is a flow diagram illustrating a method of communicating between an analog telephone unit and a stand-alone VoIP telephone.
FIG. 6 is a flow diagram illustrating a method of communicating between a telephone unit and a VoIP telephone.

FIG. 5 is a flow diagram illustrating another embodiment of a method of communicating between an analog telephone unit and a stand-alone VoIP telephone. In step 510, a stand-alone VoIP telephone receives a request from a telephone user to place a call. In a particular embodiment, the request is an off-hook request. In step 520, the VoIP telephone processes the request. The request prompts the VoIP telephone to provide a dial tone. In step 530, an analog signal from the analog telephone unit is sent over a telephone line that supports voice traffic to the VoIP telephone. The VoIP telephone includes a data interface to support communication of voice over Internet protocol. The telephone user dials a telephone number, and the subsequent TDMF tones are translated into digital packets for network transmission to a VoIP network.

An embodiment of a method of communicating between an analog POTS telephone unit and a VoIP telephone is presented in FIG. 6. In step 610, a telephone signal is received from the VoIP telephone. The VoIP telephone includes a data interface to support communication of VoIP traffic. In step 620, the VoIP telephone processes the received telephone signal and, in step 630, the VoIP telephone establishes a voice connection between the telephone unit and the VoIP telephone.

Figure 7:
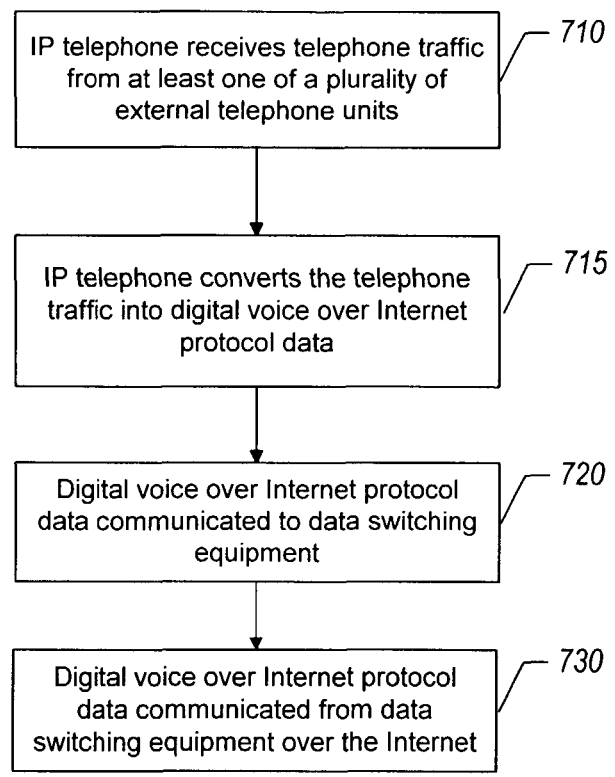
FIG. 7 is a flow diagram illustrating a method of communicating using a VoIP telephone.

FIG. 7 is a flow diagram illustrating a method of communicating using a VoIP telephone. In step 710, the VoIP telephone receives telephone traffic from at least one of a plurality of external telephone units sharing a common telephone line, e.g. the same phone extension. In step 715, the VoIP telephone converts the telephone traffic into digital voice over Internet protocol data. In step 720, the digital voice over Internet protocol data is communicated to data switching equipment, and in step 730, the digital voice over Internet protocol data is communicated from the data switching equipment over an Internet protocol (IP) network.

Figure 8:
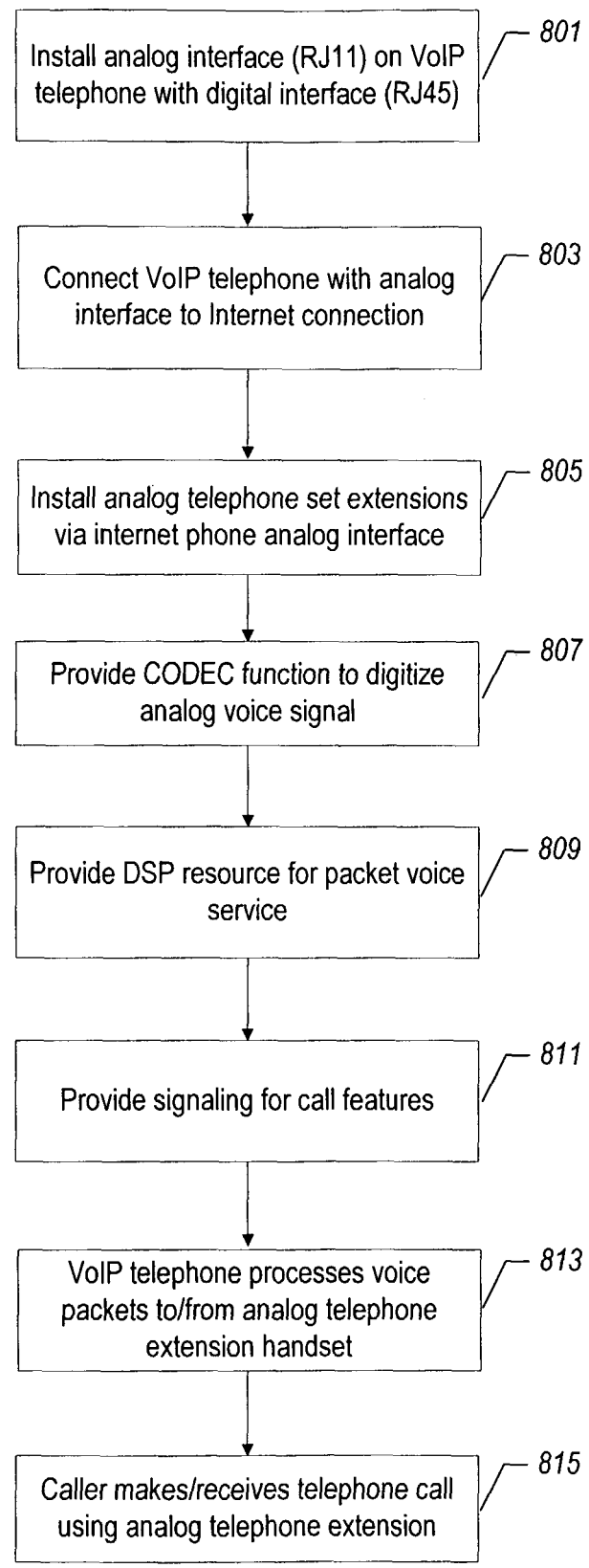
FIG. 8 is a flow diagram illustrating the use of a VoIP telephone with an analog telephone set.

FIG. 8 is a flow diagram illustrating the use of a VoIP telephone with an analog telephone set. In step 801, an analog interface, e.g., RJ11, is installed on a VoIP Internet phone. The VoIP Internet phone has a digital interface, e.g., RJ45. In step 803, the VoIP telephone with an analog interface is connected to an Internet protocol (IP) network. In step 805, analog telephone set extensions are installed via the VoIP telephone analog interface. In step 807, the VoIP telephone provides the encode/decode (codec) functions to digitize the analog voice signal. The VoIP telephone provides the digital signal processing (DSP) resource for packet voice service for the analog telephone set extensions in step 809. In step 811, the VoIP telephone provides signaling for call features such as Caller ID, distinctive ring, and the like. In step 813, the VoIP telephone processes voice packets to/from the analog telephone set extensions. In step 815, a caller makes and/or receives a telephone call using an analog telephone set extension.

The method and apparatus described herein provides for a flexible implementation. Although the invention has been described using certain specific examples, it will be apparent to those skilled in the art that the invention is not limited to these few examples. Additionally, various types of stand-alone Voice over Internet Protocol (VoIP) telephones and circuit designs are currently available which could be suitable for use in VoIP communications when employing the method and system as taught herein. The above-disclosed subject matter is to be considered illustrative, and not restrictive and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    establishing a voice over Internet protocol service line data connection between a stand-alone voice over Internet protocol telephone and an Internet protocol network via an Ethernet switch and a digital subscriber line modem, wherein a personal computer is coupled to the Ethernet switch, wherein the Ethernet switch includes logic to prioritize voice over Internet protocol data associated with the stand-alone voice over Internet protocol telephone over data associated with the personal computer, and wherein the stand-alone voice over Internet protocol telephone is coupled to the Ethernet switch via an RJ45 adaptor;
    receiving an off-hook signal from a first external analog telephone set of a plurality of external analog telephone sets, wherein the plurality of external analog telephone sets is limited to the first external analog telephone set and a second external analog telephone set, wherein the off-hook signal is received at an encoder/decoder module of the stand-alone voice over Internet protocol telephone via a first RJ11 adaptor of a plurality of RJ11 adaptors of the stand-alone voice over Internet protocol telephone, wherein the plurality of RJ11 adaptors is limited to the first RJ11 adaptor and a second RJ11 adaptor, wherein the second external analog telephone set is coupled to the stand-alone voice over Internet protocol telephone via the first external analog telephone set in a side by side configuration, wherein the side by side configuration is associated with the second RJ11 adaptor of the plurality of RJ11 adaptors, wherein the encoder/decoder module is operable to receive off-hook signals from each of the plurality of external analog telephone sets via the first RJ11 adaptor and the second RJ11 adaptor, wherein the encoder/decoder module includes a time division multiplexer to process data corresponding a dedicated voice over Internet protocol handset of the stand-alone voice over Internet protocol telephone and to process data corresponding to the first external analog telephone set and the second external analog telephone set, wherein the first external analog telephone set and the second external analog telephone set include a common telephone line extension, wherein the stand-alone voice over Internet protocol telephone includes a serial interface to permit coordination of telephone information and to provide automatic dialing, wherein the stand-alone voice over Internet protocol telephone generates line status information and provides the line status information to a first user of the first external analog telephone set and to a second user of the second external analog telephone set, wherein the line status information includes network availability information, information corresponding to whether a called party answered, and busy signal information;
    sending a dial tone from the stand-alone voice over Internet protocol telephone to the first external analog telephone set in response to the off-hook signal received from the first external analog telephone set;
    after sending the dial tone to the first external analog telephone set, receiving dual tone multi-frequency tones at the stand-alone voice over Internet protocol telephone from the particular first external analog telephone set;
    translating the received dual tone multi-frequency tones to corresponding dialed digits;
    packetizing the dialed digits;
    sending the packetized dialed digits to the Internet protocol network via the voice over Internet protocol service line data connection; and
    establishing a voice connection between the first external analog telephone set and the stand-alone voice over Internet protocol telephone.

2. An apparatus comprising:
    a voice over Internet protocol telephone configured to:
        establish a voice over Internet protocol service line data connection between the stand-alone voice over Internet protocol telephone and an Internet protocol network via an Ethernet switch and a digital subscriber line modem, wherein a personal computer is coupled to the Ethernet switch, wherein the Ethernet switch includes logic to prioritize voice over Internet protocol data associated with the stand-alone voice over Internet protocol telephone over data associated with the personal computer, and wherein the stand-alone voice over Internet protocol telephone is coupled to the Ethernet switch via an RJ45 adaptor;

receive an off-hook signal from a first external analog telephone set of a plurality of external analog telephone sets, wherein the plurality of external analog telephone sets is limited to the first external analog telephone set and a second external analog telephone set, wherein the off-hook signal is received at an encoder/decoder module of the stand-alone voice over Internet protocol telephone via a first RJ11 adaptor of a plurality of RJ11 adaptors of the stand-alone voice over Internet protocol telephone, wherein the plurality of RJ11 adaptors is limited to the first RJ11 adaptor and a second RJ11 adaptor, wherein the second external analog telephone set is coupled to the stand-alone voice over Internet protocol telephone via the first external analog telephone set in a side by side configuration, wherein the side by side configuration is associated with the second RJ11 adaptor of the plurality of RJ11 adaptors, wherein the encoder/decoder module is operable to receive off-hook signals from each of the plurality of external analog telephone sets via the first RJ11 adaptor and the second RJ11 adaptor, wherein the encoder/decoder module includes a time division multiplexer to process data corresponding a dedicated voice over Internet protocol handset of the stand-alone voice over Internet protocol telephone and to process data corresponding to the first external analog telephone set and the second external analog telephone set, wherein the first external analog telephone set and the second external analog telephone set include a common telephone line extension, wherein the stand-alone voice over Internet protocol telephone includes a serial interface to permit coordination of telephone information and to provide automatic dialing, wherein the stand-alone voice over Internet protocol telephone generates line status information and provides the line status information to a first user of the first external analog telephone set and to a second user of the second external analog telephone set, wherein the line status information includes network availability information, information corresponding to whether a called party answered, and busy signal information;

send a dial tone from the stand-alone voice over Internet protocol telephone to the first external analog telephone set in response to the off-hook signal received from the first external analog telephone set;

after sending the dial tone to the first external analog telephone set, receive dual tone multi-frequency tones at the stand-alone voice over Internet protocol telephone from the first external analog telephone set;

translate the received dual tone multi-frequency tones to corresponding dialed digits;

packetize the dialed digits;

send the packetized dialed digits to the Internet protocol network via the voice over Internet protocol service line data connection; and establish a voice connection between the first external analog telephone set and the stand-alone voice over Internet protocol telephone.

3. A computer-readable storage medium comprising instructions that, when executed by a processor, cause the processor to perform operations, the operations comprising:

establishing a voice over Internet protocol service line data connection between a stand-alone voice over Internet protocol telephone and an Internet protocol network via an Ethernet switch and a digital subscriber line modem, wherein a personal computer is coupled to the Ethernet switch, wherein the Ethernet switch includes logic to prioritize voice over Internet protocol data associated with the stand-alone voice over Internet protocol telephone over data associated with the personal computer, and wherein the stand-alone voice over Internet protocol telephone is coupled to the Ethernet switch via an RJ45 adaptor;

receiving an off-hook signal from a first external analog telephone set of a plurality of external analog telephone sets, wherein the plurality of external analog telephone sets is limited to the first external analog telephone set and a second external analog telephone set, wherein the off-hook signal is received at an encoder/decoder module of the stand-alone voice over Internet protocol telephone via a first RJ11 adaptor of a plurality of RJ11 adaptors of the stand-alone voice over Internet protocol telephone, wherein the plurality of RJ11 adaptors is limited to the first RJ11 adaptor and a second RJ11 adaptor, wherein the second external analog telephone set is coupled to the stand-alone voice over Internet protocol telephone via the first external analog telephone set in a side by side configuration, wherein the side by side configuration is associated with the second RJ11 adaptor of the plurality of RJ11 adaptors, wherein the encoder/decoder module is operable to receive off-hook signals from each of the plurality of external analog telephone sets via the first RJ11 adaptor and the second RJ11 adaptor, wherein the encoder/decoder module includes a time division multiplexer to process data corresponding a dedicated voice over Internet protocol handset of the stand-alone voice over Internet protocol telephone and to process data corresponding to the first external analog telephone set and the second external analog telephone set, wherein the first external analog telephone set and the second external analog telephone set include a common telephone line extension, wherein the stand-alone voice over Internet protocol telephone includes a serial interface to permit coordination of telephone information and to provide automatic dialing, wherein the stand-alone voice over Internet protocol telephone generates line status information and provides the line status information to a first user of the first external analog telephone set and to a second user of the second external analog telephone set, wherein the line status information includes network availability information, information corresponding to whether a called party answered, and busy signal information;

sending a dial tone from the stand-alone voice over Internet protocol telephone to the first external analog telephone set in response to the off-hook signal received from the first external analog telephone set;

after sending the dial tone to the first external analog telephone set, receiving dual tone multi-frequency tones at the stand-alone voice over Internet protocol telephone from the first external analog telephone set;

translating the received dual tone multi-frequency tones to corresponding dialed digits;

packetizing the dialed digits;

sending the packetized dialed digits to the Internet protocol network via the voice over Internet protocol service line data connection; and establishing a voice connection between the first external analog telephone set and the stand-alone voice over Internet protocol telephone.

* * * * *